(12) United States Patent
Xie

(10) Patent No.: US 7,866,432 B2
(45) Date of Patent: Jan. 11, 2011

(54) CHASSIS FOR ELECTRIC VEHICLES

(75) Inventor: Shouchun Xie, Shanghai (CN)

(73) Assignee: Sanford Tools Co., Ltd., Hangzhou, Zhejiang Province (CN)

( * ) Notice: Subject to any disclaimer, the term of this patent is extended or adjusted under 35 U.S.C. 154(b) by 793 days.

(21) Appl. No.: 11/823,305

(22) Filed: Jun. 27, 2007

(65) Prior Publication Data

US 2008/0006465 A1    Jan. 10, 2008

(30) Foreign Application Priority Data

Jun. 27, 2006    (CN) .................... 2006 2 0121006 U

(51) Int. Cl.
*B60K 1/02*     (2006.01)
*B60K 17/30*    (2006.01)
(52) U.S. Cl. ..................... 180/252; 180/65.1
(58) Field of Classification Search ............... 180/65.1, 180/65.21, 65.51, 252
See application file for complete search history.

(56) References Cited

U.S. PATENT DOCUMENTS

| | | | | |
|---|---|---|---|---|
| 4,042,055 A * | 8/1977 | Ward | ........................... | 180/60 |
| 4,433,744 A * | 2/1984 | Muhlbacher | ................ | 180/65.7 |
| 4,647,067 A * | 3/1987 | Paquette et al. | ............. | 280/676 |
| 5,339,611 A * | 8/1994 | Roderfeld et al. | ......... | 56/10.2 R |
| 5,443,013 A * | 8/1995 | Menz et al. | .................... | 104/69 |
| 5,911,426 A * | 6/1999 | Yamamoto et al. | ..... | 280/124.128 |
| 5,921,338 A * | 7/1999 | Edmondson | ............. | 180/65.51 |
| 5,997,013 A * | 12/1999 | Claxton | ................... | 280/6.154 |
| 6,012,724 A * | 1/2000 | Pitkanen | .................. | 280/6.155 |
| 6,288,505 B1 * | 9/2001 | Heinzmann et al. | ......... | 318/139 |
| 7,137,473 B2 * | 11/2006 | Rickers | ..................... | 180/282 |

FOREIGN PATENT DOCUMENTS

CN    200320127977.7    2/2005

* cited by examiner

*Primary Examiner*—Lesley D. Morris
*Assistant Examiner*—Bridget Avery
(74) *Attorney, Agent, or Firm*—Hamre, Schumann, Mueller & Larson, P.C.

(57) ABSTRACT

The present invention discloses an electric vehicle chassis applicable to the field of the electric vehicle technology. The object is to provide an electric vehicle with light weight and good driving stability. The electric vehicle chassis according the present invention comprises a frame and a power real axle, wherein the left and right rear wheels connected to the rear axle are driven by left and right motors, respectively, and a pendulum shaft is provided between the real axle and the frame for the swinging of the rear axle. Meanwhile, the rear wheels on both sides of the rear axle can also be directly driven by the respective full gear reduction motors, and the rear axle can be provided with a limiting swinging device thereon. The present invention includes characteristics such as light weight, low center of gravity, impossibility of turning over sideward during full speed steering, flexibility and automatic restoration, and is suitable for sports and recreation.

11 Claims, 7 Drawing Sheets

US 7,866,432 B2

CHASSIS FOR ELECTRIC VEHICLES

TECHNICAL FIELD

The present invention relates to an electric vehicle, more especially, to a chassis for electric vehicles.

BACKGROUND ART

At present, motor vehicles have become necessary transportation means in daily life. Specifically, cars and motorcycles have almost been involved in every aspect of the life of the people nowadays. Today, with the increasing environment-friendly consciousness, as the fuel vehicles (consuming fuel), such as cars and motorcycles, bring about the problem of air pollution, electric vehicles with environment-friendly purpose have emerged. And various electric vehicles can be seen.

To reduce the vehicle self-weight and cost, the conventional chassis for electric vehicles, which has a differential and half-axle combination, can not meet current requirements. Consequently, an electric vehicle driven by double motors have been presented.

A double motor driving mechanism for electric vehicles disclosed in Chinese Patent No. CN200320127977.7 comprises two driving motors and two driving wheels, wherein said two driving motors are connected to the two driving wheels, respectively. Such driving means, i.e. in which double motors operate to drive individually, leaves out both the conventional rear axle combination having a differential and half-axle and the complicated mechanical driving gears, greatly decreasing the vehicle weight and cost as a whole and reducing the power loss. Also it can totally avoid the disadvantage with the conventional mechanical differential, i.e. the whole vehicle can not move forward as a result of that one wheel can not rotate while another one is wheelspining. However, when the ground is not absolutely flat, only three of the four wheels of a rigid vehicle frame are in contact with the ground. If the front wheel tilts, the steering stability will be affected. In case that a rear wheel is separated away from the ground, the driving force will be reduced. Additionally, both of the above situations seriously affect the safety and stability of vehicle driving. Accordingly, along with using the double motor for driving and reducing the total vehicle weight, it is also necessary to improve the stability and power output characteristics of electric vehicle chassis.

SUMMARY OF THE INVENTION

An object of the present invention is to provide an electric vehicle chassis with light weight and good stability.

In order to achieve the above object, the electric vehicle chassis according to the present invention comprises a rigid frame and a rear axel, wherein that the left and right rear wheels on both sides of the rear axle are driven by left and right motors individually, the rear axle is connected with the frame through a pendulum shaft, and the pendulum shaft makes the rear axle swing relative to the frame.

Meanwhile, said frame is provided thereon with a contact surface, corresponding to which the rear axle is also provided with a contact surface, and the pendulum shaft is engaged with the pivot hole provided on the rear axle.

Meanwhile, the contact surface on said frame is a slant surface to which the pendulum shaft is provided perpendicular.

Meanwhile, said rear axle has a recess region in which the left and right motors are positioned, and a reduction device is disposed between the left motor and the left rear wheel and between the right motor and the right rear wheel.

Meanwhile, said rear axle includes left and right support parts supporting the left and right rear wheels and a connecting bracket connecting the left and right support parts, wherein the connecting bracket has ⊏ shape and is provided slantly downward.

Meanwhile, a limiting device is provided between said rear axle and the frame, wherein the limiting device defines a swinging region of the rear axle relative to the frame.

Meanwhile, said limiting device includes left and right stop blocks, which are symmetrically provided at the connecting bracket and located on the both sides in respect to the longitudinal central plane of the frame.

Meanwhile, said limiting device comprises a movable pressing plate, a resistant member biasing against the pressing plate, and a guide post for the movable pressing plate, wherein the guide post is mounted on the frame.

Meanwhile, said electric vehicle chassis also includes an electric control system which in turn includes a power supply, left and right controllers electrically connected with the power supply and a control loop controlling the operation of the left and right controllers, wherein the left controller is electrically connected with the left motor while the right controller is electrically connected with the right motor. In addition, a Hall accelerator is arranged in the control loop and operates to output signal voltage. The left and right controllers receive the signal voltage and then output the corresponding driving voltages, respectively, to control the rotate speeds of the left and right motors.

Meanwhile, said control loop further comprises a steering sensor connected in series in the control loop. The steering sensor senses and measures the steering of the front wheel and outputs the corresponding reduction signal voltage to reduce the speed of the motor connected to the rear wheel on the inner side of steering.

Meanwhile, said steering sensor basically includes a magnet block fixed to a steering swinging arm and the left and right Hall sensors provided symmetrically on both sides of the steering swinging arm, wherein the left and right Hall sensors sense and measure the steering of the steering swinging arm and output the corresponding reduction signal voltages.

Meanwhile, an electronic door lock and a brake powerdown switch are connected in series in said control loop. A reversing switch with the first position and second position is electrically connected between the left and right controllers and the left and right motors. With the reversing switch at the first position, the left and right motors are running forward. On the contrary, with the reversing switch at the second position, the left and right motors are running backward.

Meanwhile, said electric vehicle chassis further includes a brake device, which in turn includes a brake pedal, a brake tray provided on the left and right rear wheels, a dish brake clamp provided at the rear axle, and a driving steel rope connecting the brake pedal and the dish brake clamp, wherein the brake powerdown switch is disposed under the brake pedal. As the brake pedal is located at the brake position, the brake powerdown switch disconnects the control loop of controller.

Meanwhile, said electric vehicle chassis further includes a steering control device for the front axle and front wheel which are connected together with the rigid frame. The steering control device comprises a steering handlebar, a post transferring the torque of the steering handlebar, a steering swinging arm, a lateral draw rod, left and right steering knuckles connected with the left and right front wheels, and a long draw rod connecting the left and right steering knuckles, wherein the post is connected with the steering swinging arm to drive it rotating; the lateral draw rod at one end is connected with the end of the steering swinging arm far away from the post and at the other end is connected with one of the left and right steering knuckles; the left and right steering knuckles are connected pivotally to both ends of the front axle; the left and right front wheels are mounted on the left and right steering knuckles, respectively, and the left and right front wheels are driven to steer by the turning of the steering handlebar.

Meanwhile, said front axle is fixed with a steering knuckle bearing housing at both ends, wherein the left and right steering knuckles are pivotally connected together through a king bolt and the steering knuckle bearing housing, and the steering knuckles are slant backward while the king bolt is slant inwardly.

Meanwhile, alternatively, said frame has only one front wheel which is a steering wheel.

The electric vehicle chassis according to another aspect of the present invention includes a driven front axle, a rigid frame fixedly connected to the driven front axle, and a rear axle connected with the frame, wherein the left and right rear wheels supported at both sides of the rear axle are directly driven by the left and right full gear reduction motors, respectively, wherein the full gear reduction motor includes a motor and a gear reduction device forming a one-piece structure, and also, the rear axle is provided with a limiting swinging device of the real axle relative to the frame.

Meanwhile, said rear axle comprises left and right support parts supporting the left and right rear wheels and a connecting bracket fixedly connecting the left and right support parts. The left and right full gear reduction motors are positioned in the recess region defined by the connecting bracket. The limiting swinging device includes a pendulum shaft and limiting blocks. In addition, the pendulum shaft is slantly provided on the frame and located in the longitudinal central plane of the same. The limiting blocks are symmetrically provided on the connecting bracket with the pendulum shaft as the center, wherein the pendulum shaft connects the rigid frame and the connecting bracket of rear axle.

Meanwhile, said electric vehicle chassis further comprises a steering control device which in turn includes a steering handlebar, a post transferring the torque of the steering handlebar, a steering swinging arm, a lateral draw rod, left and right steering knuckles connected to the left and right front wheels, and a long draw rod connecting the left and right steering knuckles, wherein the post is fixedly connected to one end of the steering swinging arm to drive the steering swinging arm turning; the lateral draw rod at one end is pivotally connected to the end of the steering swinging arm far away from the post and at the other end is pivotally connected to one of the left and right steering knuckles; the left and right steering knuckles are pivotally connected to both ends of the front axle; the left and right front wheels are mounted on the left and right steering knuckles, respectively, and are driven to steer by the turning of the steering handlebar.

Meanwhile, a steering handlebar post is provided between said steering handlebar and the post, wherein the steering handlebar is mounted on the steering handlebar post with an adjustable position. The steering handlebar post is inserted into the steering post. The steering post has an upper post and a lower post which are pivotally connected together.

Meanwhile, said electric vehicle chassis further comprises a control system for electric devices which in turn includes a power supply, left and right controllers electrically connected to the power supply, and a control loop controlling the operation of the left and right controllers; wherein a reversing switch is connected in series between the left controller and the left motor and between the right controller and the right motor. Moreover, a Hall accelerator, steering sensors, and a brake powerdown switch are electrically connected in the control loop, wherein the Hall accelerator and the steering sensors operate to output signal voltages to the left and right controllers which then output corresponding driving voltages to control the rotate speeds of the left and right motors, respectively.

In view of the above construction of the present invention, the rigid frame is provided so as to simplify the whole construction of vehicle and remove the traditional rear axle combination having a planet gear differential and a half-axle, thereby resulting in light weight as a whole and small power loss in vehicles. The swinging limiting device is provided for that the rear axle can adjust the running posture of the electric vehicle such that the rigid frame may secure the four wheels to keep in contact with the ground simultaneously in case of non-flat ground or random steering. Accordingly, during the traveling of the vehicle, it can avoid the problem of the running instability and power loss due to that the front or rear wheel tilts away from the ground.

DESCRIPTION OF PREFERRED EMBODIMENTS

Hereinafter, embodiments of the present invention are described in detail in conjunction with the accompanying figures.

Figure 1:
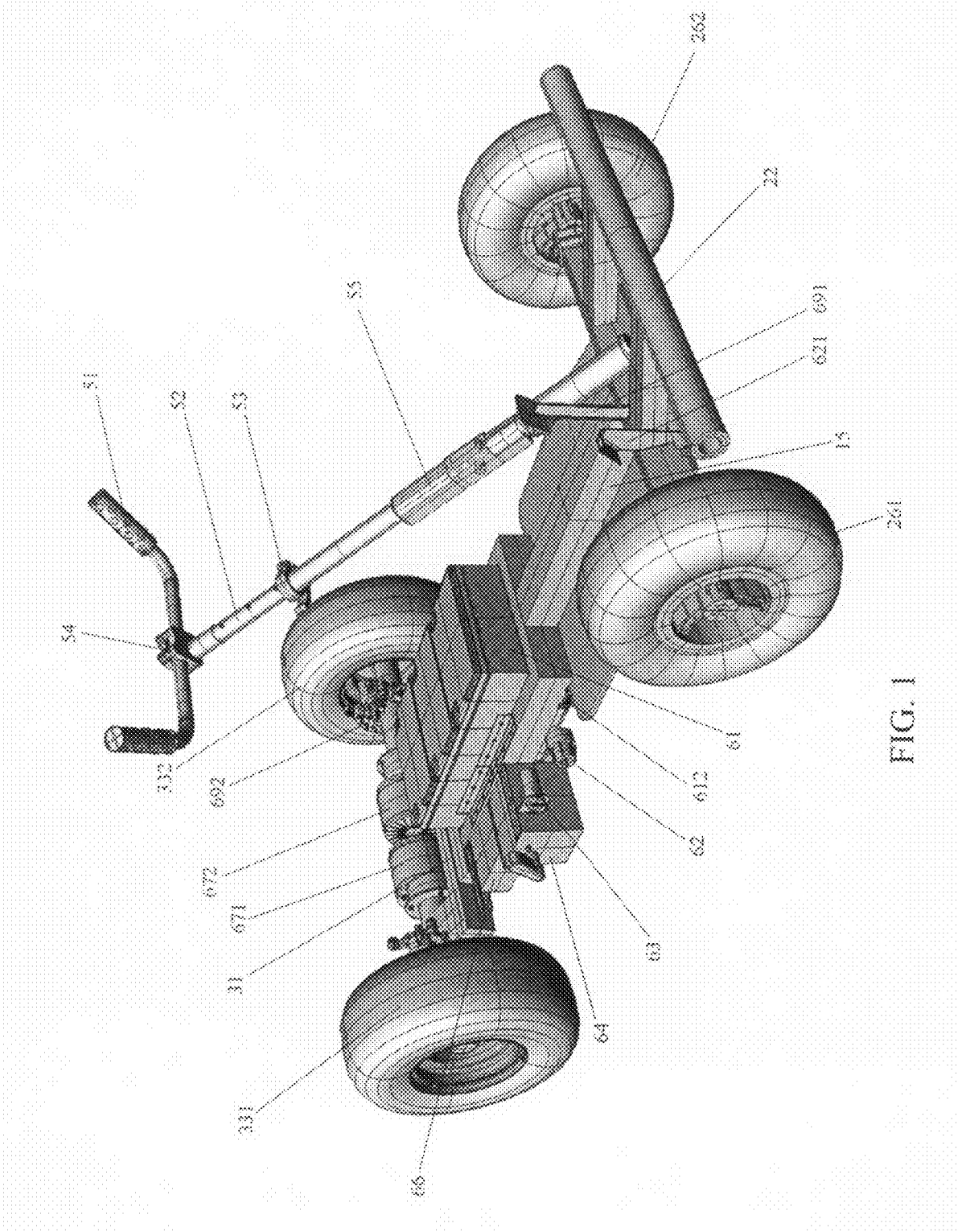
FIG. 1 is a block diagram of the electric vehicle chassis according to the present invention.
Figure 2:
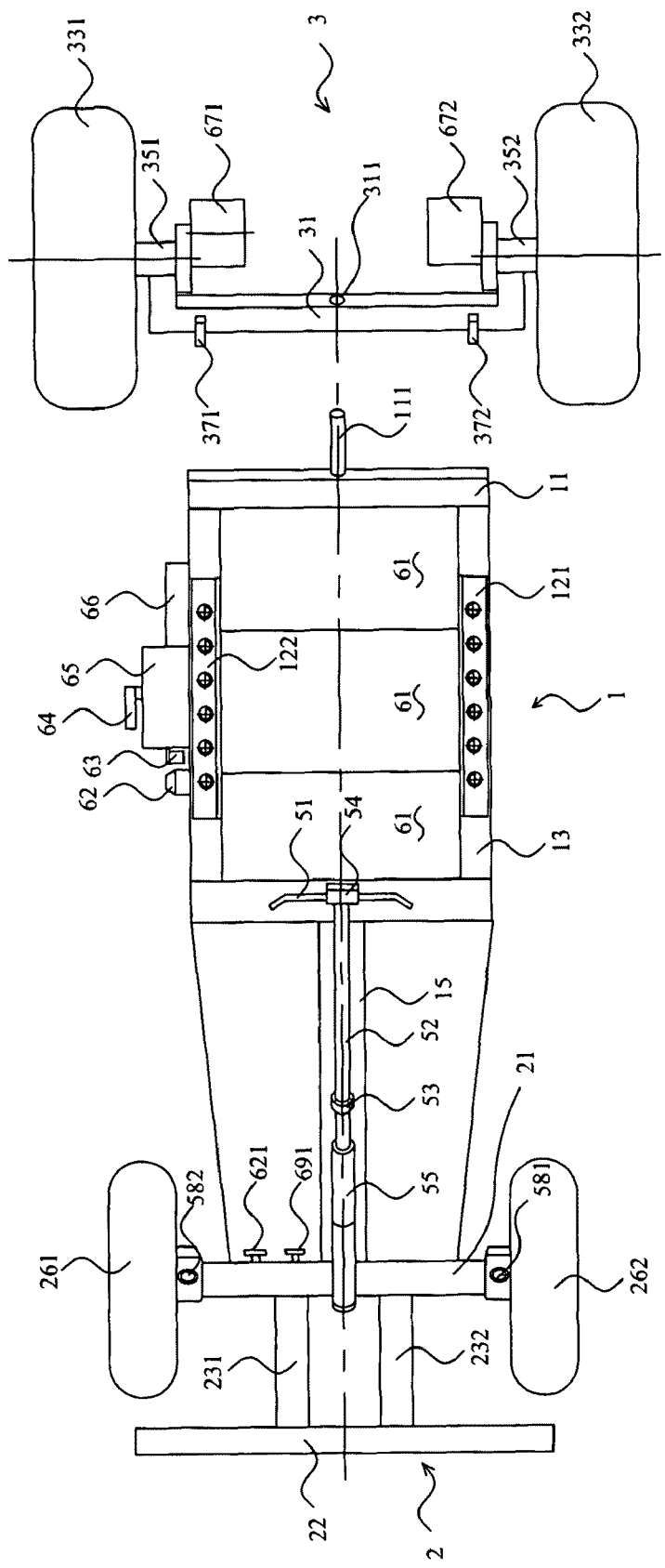
FIG. 2 is a top construction view illustrating the electric vehicle chassis according to the present invention with the frame separated from the rear axle.
Figure 3:
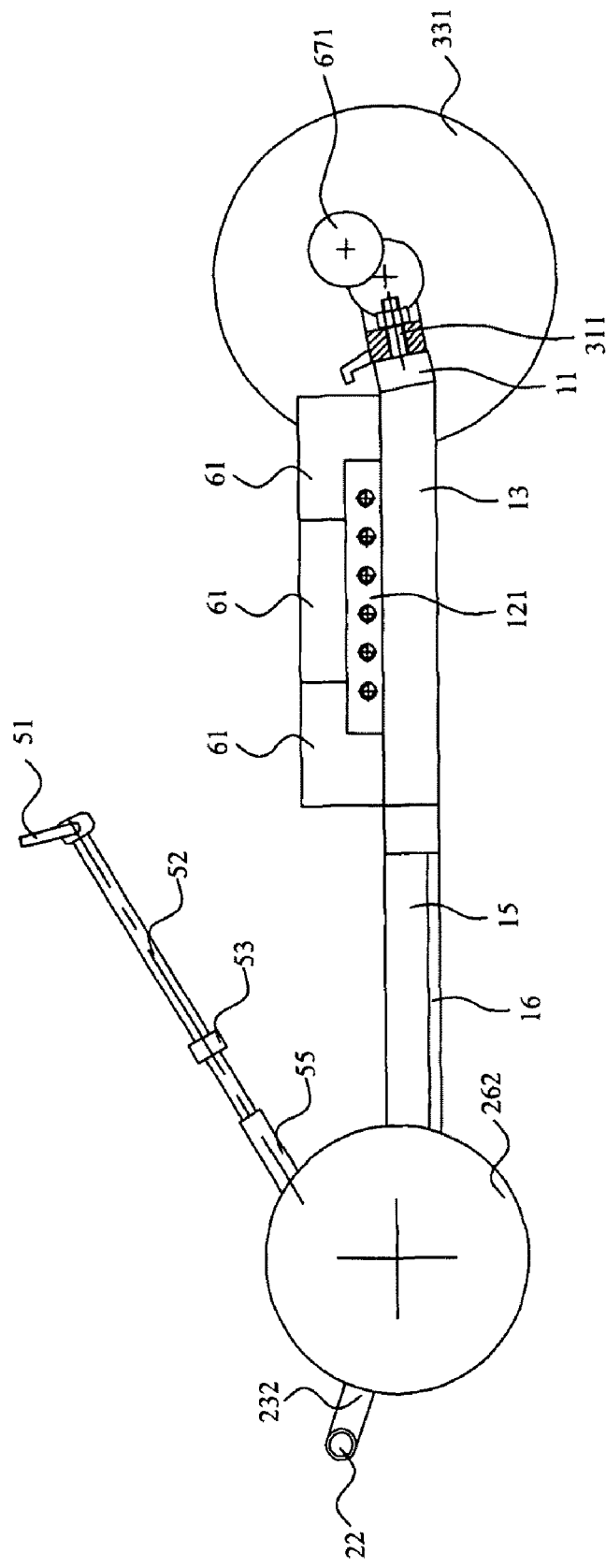
FIG. 3 is a front construction view illustrating the electric vehicle chassis according to the present invention with the frame engaging with the rear axle.

Referring to FIG. 1, 2 and 3, a front axle 2 and a frame 1 are welded together as a rigid structure which is generally formed by welding square tubes with rectangle shape. The most front end of the rigid structure is a bumper 22, which is connected backward to a lateral front axle 21 through double parallel tubes 231 and 232 and then is further connected backward to a rectangle structure 13 accommodating a storage battery 61 through a square tube 15. On the rectangle structure 13, the storage battery 61 is fixed at both sides with angle irons 121 and 122 on which plural mounting holes are arranged to fasten a driver seat (not shown) at different positions, i.e. front and rear positions.

A rear axle 3 comprises left and right support parts 351 and 352 supporting left and right real wheels and a connecting bracket 31 which connects said left and right support parts and has ⊏ shape, therefore the rear axle 3 has a recess region helping to receive a motor (described later). Additionally, as the connecting bracket 31 is provided slantly downward, in the case of the electric vehicle chassis, the height of center of gravity can be effectively lowered, such that the electric vehicle is relatively stable while running.

In general, the left and right support parts 351 and 352 are provided with bears, respectively, wherein the axle of a rear wheel 331 is connected to the output shaft of a direct current (DC) full gear reduction motor 671 through the bear in the support part 351 and a shaft coupling, and the rear wheel 332 is connected to the output shaft of a direct current (DC) full gear reduction motor 672 through the bear in the support part 352 and a shaft coupling. The DC full gear reduction motors 671 and 672 described herein include motors and full gear reduction devices with the motor and the full gear reduction device integrated to one piece member. Such compact structure has low cost and long lifetime, and is adaptive for use and installation in small space without the maintaining and controlling.

It should be appreciated that the above gear reducer is an example of the reduction device which can be other types of reduction devices such as a harmonic gear reducer or a cycloid pin wheel reducer. It is apparent to those skilled in the art that the DC motor and gear reducer may also be separable structure and connected to the rear wheels through chain drive, belt drive or other driving means. Such double motor individual driving means eliminates the conventional rear axle combination having the planet gear differential and half axle while removing the corresponding mechanical driving mechanism. Accordingly, the weight and cost of whole vehicle and power loss are greatly reduced and at the same time, the problem with the conventional mechanical differential, i.e. the whole vehicle can not move due to the wheels-pining occurring to one wheel, is completely prevented.

Figure 4:
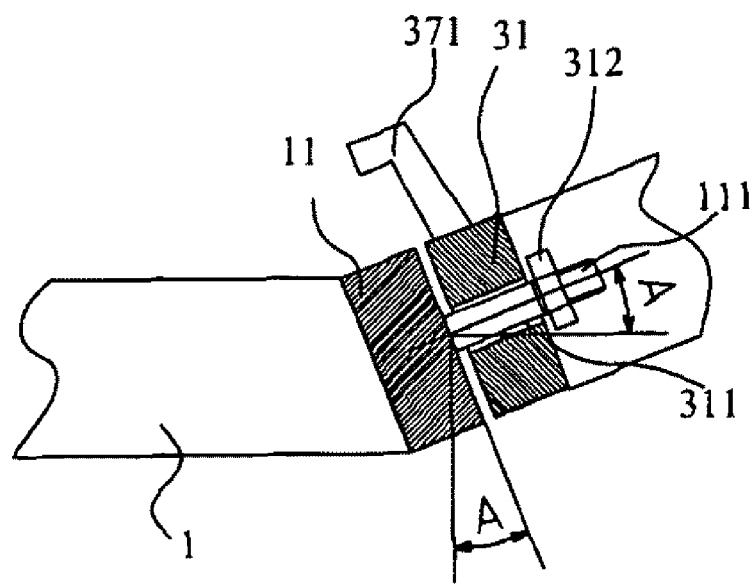
FIG. 4 illustrates the swinging limiting device of the electric vehicle chassis according to the present invention.

FIG. 4 illustrates a swinging limiting device or a swinging limit mechanism for an electric vehicle. The swinging limit mechanism comprises a pendulum shaft 111 and limiting blocks 371 and 372. The pendulum shaft 111 is fastened on a beam 11 on the back side of a rectangle structure 13, wherein the beam II and the rectangle structure 13 are welding together to form a structure having a contact surface 113 thereon to which the pendulum shaft 111 is perpendicular.

The connecting bracket 31 of the rear axle 3 is provided with a opening 311 to receive the pendulum shaft 111 and with a contact surface 313. When the pendulum shaft 111 is cooperating with the opening 311 and is fastened by a holding member such as a nut 312, the rear wheel 3 can swing relative to the frame 1. Herein, the contact surface 313 is also cooperating with the contact surface 113 in order to prevent the rear axle from shaking relative to the frame and affecting the driving stability during driving. In general, the pendulum shaft 111 and the opening 311 are positioned in the longitudinal central plane of the frame 1. Obviously, if necessary, it is possible to properly adjust the position of the pendulum shaft such that the lateral driving stability is not impacted during driving even if the pendulum shaft 111 is offset from the longitudinal central plane of the frame 1.

Preferably, the contact surface 113 of the beam 11 is slantly provided with an angle A with the vertical plane and the pendulum shaft 111 is perpendicular to the contact surface 113, therefore there is also an angle A between the pendulum shaft and the horizontal plane. It is understood that the angle A is provided to help the contact between the contact surface 113 of the frame and the contact surface 313 of the rear axle, so when the frame is driven by the rear axle during driving, the power can be smoothly transferred to the frame. In the figures of the present invention, although it is shown that the contact surface 113 and the contact surface 313 cooperating with the former slant forward such that in the case that the vehicle encounters an obstacle, only small part of the swinging of rear wheels is transferred to the frame, thus the driving is stable without the feeling of encountering the obstacle, the contact surface 113 and the contact surface 313 cooperating with the former can be provided slantly backward such that the contact surface 113 of the frame is located above the contact surface 313 of the connecting bracket, causing that it is difficult for the rear axle to twist during the driving of the vehicle. Herein, the value of the angle A can be selected according to a design requirement, such as within the range from 10 degrees to 30 degrees, for example, 12 degrees, 18 degrees etc.

Certainly, the swinging region of the rear axle relative to the frame is preferably limited through a limiting device, so the problem that the vehicle is turned over due to the excess swinging of the rear axle during making a turn at a high speed can be avoided while all of the four wheels are secured in contact with the ground. Referring to FIG. 4, in the present invention, it is achieved through a swinging limiting device that, on the connecting bracket 31 of the rear axle, the opening 311 is provided at both sides with stop blocks 371 and 372 which contact with the upper end face of the beam 11, respectively, when the rear axle swings through a certain angle, so as to prevent the rear axle from further rotating, i.e., when the rear axle 3 is swinging around the central axis of the opening 311 relative to frame 1, the stop blocks 371 and 372 limit the swinging region of the rear axle, for example, the two stop blocks 371 and 372 limit the swinging of the rear axle between −6° and +6°.

Figure 5:
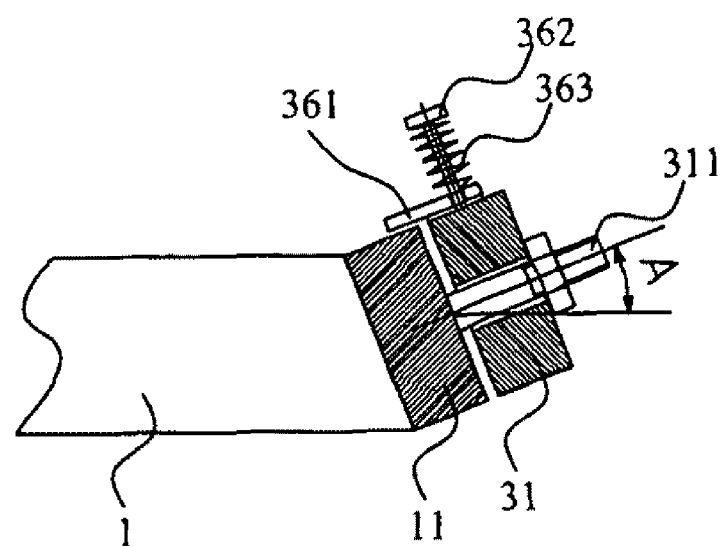
FIG. 5 illustrates another construction of the swinging limiting device of the electric vehicle chassis according to the present invention.

FIG. 5 illustrates another swinging limiting mechanism (or swinging limiting device) limiting the steering of the rear axle 3 engaging with the frame 1, which is similar to FIG. 4 except that a resistant limiting device is provided to replace the stop blocks. The resistant limiting device comprises a movable pressing plate 361, a resistant member 363 biasing against the pressing plate 361, and a guide post 362 for the movable pressing plate 361. When the rear axle 3 is rotating, the movable pressing plate 361 comes to contact with the beam 11 and then the rear axle keeps on rotating. When the movable pressing plate moves to the top dead center along the guide post, the rotating of the rear axle is stopped. During the rotating of the rear axle, the vibration is absorbed by a spring, resulting in the more comfortable driving of the electric vehicle.

According to the principle of the relative motion, it is apparent to those skilled in the art that the pendulum shaft can also be provided on the rear axle and a hole is provided on the beam 11 corresponding to the pendulum shaft. The stop block or resistant limiting mechanism can be provided either on the rear axle or on the beam or the frame as long as it can limit the swinging region or angle of the rear axle. The contact surface can also be provided perpendicularly. Additionally, other members can be used to implement the function of said contact surface. Moreover, it may be sliding friction or rolling friction between the hole and pendulum shaft, for example, rollers may be provided between the pendulum shaft and the hole. Of course, said hole may be the inner hole of the bear. Also, all of the above arrangements may be applicable for the frame and rear axle of a three-wheel electric vehicle.

Figure 7:
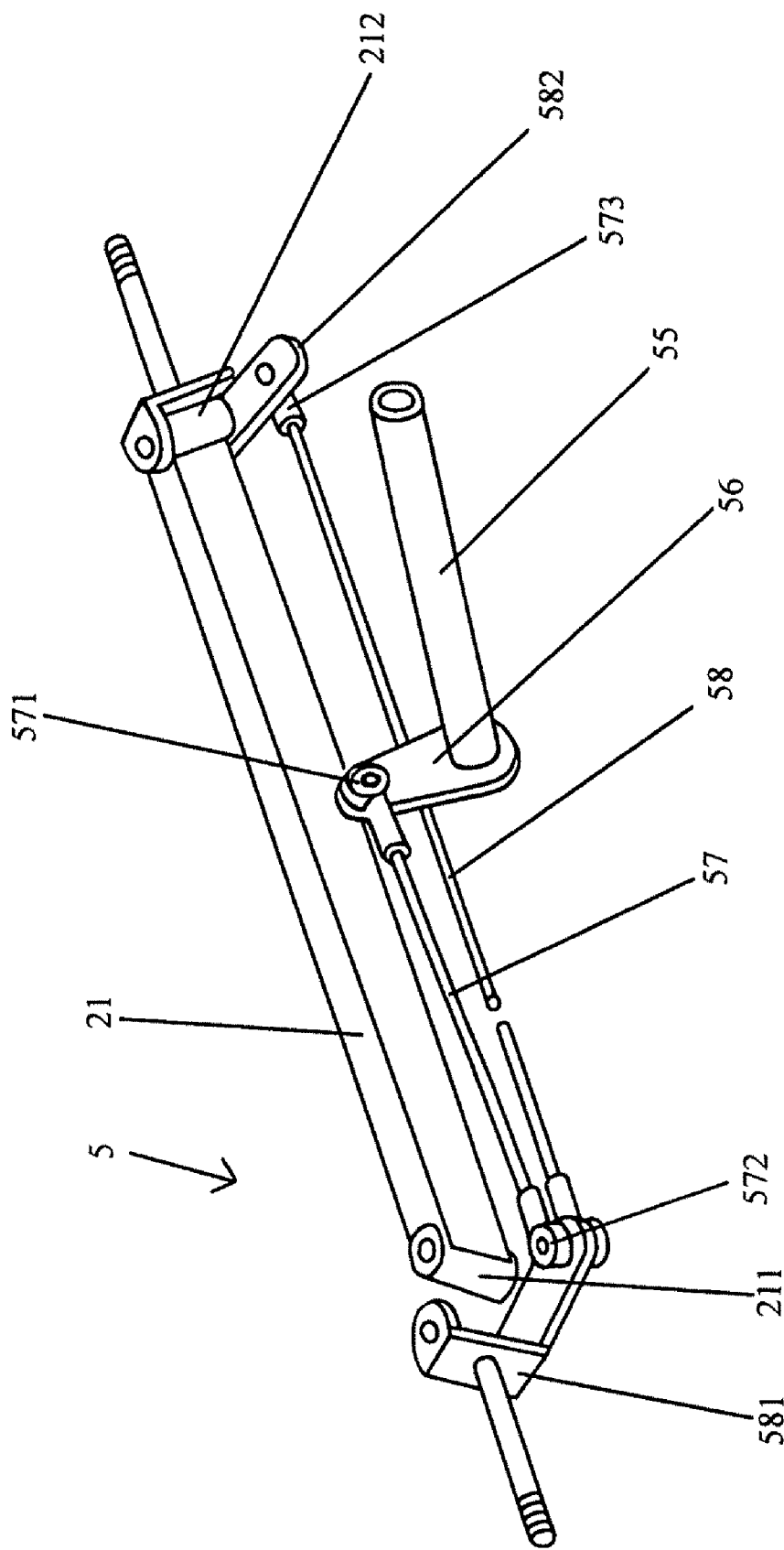
FIG. 7 is a view of a steering control device for an electric vehicle chassis.

FIG. 7 illustrates a steering control device (or called as steering operating mechanism) of the present invention. Referring to FIG. 7, a steering control device or steering operating mechanism 5 basically comprises a post 55, a steering swinging arm 56, a lateral draw rod 57, a long draw rod 58, a left steering knuckle 581, and a right steering knuckle 582. The post 55 is connected at one end with a steering handlebar post 52 and at the other end with a steering swinging arm 56.

When the steering handlebar 51 is steering, the steering swinging arm 56 is rotating with it simultaneously. The lateral draw rod 57 is pivotally connected at one end with the steering swinging arm 56 and at the other end with the left steering knuckle 581. Alternatively, the other end of the lateral draw rod 57 may be pivotally connected with the right steering knuckle 582. The long draw rod 58 is provided at one end with a draw rod ball bearing 572 and at the other end with a draw rod ball bearing 573, wherein the long draw rod 58 is movably connected with the left steering knuckle 581 through the draw rod ball bearing 572 and with the right steering knuckle 582 through the draw rod ball bearing 573. In this way, the left and right steering knuckles 581 and 582 are formed in coupling relationship. The front axle 21 is welded at both ends with steering knuckle supporting bases 211 and 212 symmetrically. The left and right steering knuckles 581 and 582 are pivotally connected to their respective steering knuckle supporting bases 211 and 212 through a king bolt. The steering knuckle supporting bases 211 and 212 are welded to both ends of the lateral front axle 21.

The steering handlebar 51 drives the steering swinging arm 56 to swing to right and left through the steering handlebar post 52 and the steering post 55 and drives the left front wheel 262 to steer through the lateral draw rod 57. And then the right font wheel 261 is driven to steer simultaneously through the long draw rod 58. Thereby the steering action of the whole vehicle is completed. Those skilled in the art can calculate the length of the steering arm and the base angle of the trapezoid according to the trapezoid construction principle for vehicle steering. Thereby, during the steering of the vehicle, the temporal turning center of the two front wheels is located on the extension of the axis of rear wheels. In addition, properly, the steering knuckles are provided slantly backward while the king bolt is provided slantly inward, which can secure flexible steering, facilitated returning, and minimized side friction of the tires of the front wheels when steering.

Since the left and right steering knuckles of the front axle 2 have a backward inclination angle and an inward inclination angle, the movement loci of the lowermost ends of the front wheels 261 and 262 are not in a plane parallel with the ground, and the lowermost ends of the front wheels on the inner and outer sides with respect to steering are shifted downward and upward respectively. In the rigid frame, although all of the four wheels are in contact with the ground simultaneously during direct movement, only the front wheel on the inner side with respect to the steering and the both rear wheels are in contact with ground when steering and contrarily the front wheel on the outer side with respect to the steering is warped away from the ground. The swinging limiting mechanism is provided such that it can be secured that when the ground is not flat or the steering is arbitrarily implemented, the rigid frame 1 still can assure that all of the four wheels are in contact with the ground simultaneously, thereby the problem that the vehicle is turned over sideward due to the excess swinging of the rear axle can be avoided during driving.

As shown in FIGS. 1 and 3, the steering handlebar 51 is mounted in a slipknot 54 at the upper end of the steering handlebar post 52 inserted in the steering post 55 and clamped by a speedy chuck 53, wherein the angle of the steering handlebar 51 may be adjusted by the slipknot 54 and the vertical position of the steering handlebar post 52 is determined by the length thereof inserted in the steering post 55. The lower end of the steering post is configured to have two sections, thus the steering post 55 may be folded downward after the releasing of a set screw, causing the minimized volume during the packing, transporting and storing. In addition, there are other ways to reduce the volume during the packing, transporting and storing, for example, the seat (not shown in figures, which is mounted on an angle iron 121 with holes and above the battery) may be made as a foldable structure so as to reduce the occupied space for the whole vehicle.

Figure 6:
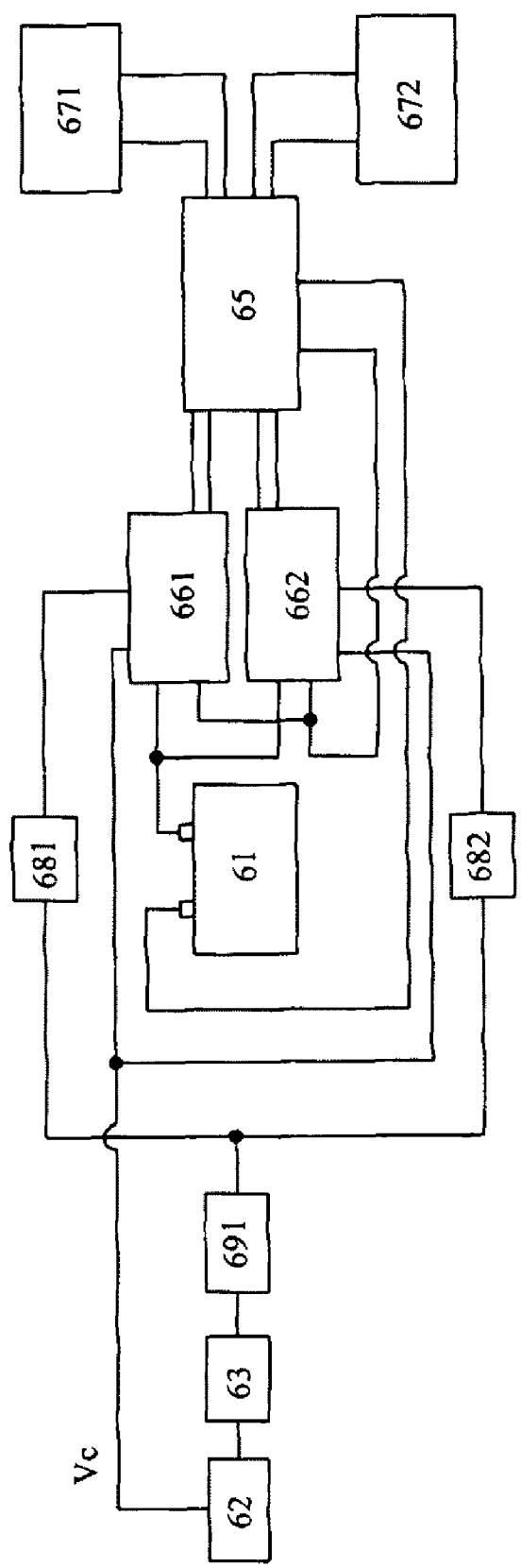
FIG. 6 illustrates the electric principle diagram of the electric control system for an electric vehicle chassis.

As shown in FIG. 1, the electric vehicle chassis or the electric vehicle according to the present invention also comprises a brake device. The brake device includes a brake pedal 691, brake trays 692 provided on the left and right rear wheels, a dish brake gripper mounted on the rear axle, and a driving steel wire connecting the brake pedal and the dish brake gripper. The brake device is known for those skilled in the art and not described in detail herein. The description of the electric control system 6 for the electric vehicle chassis according to the present invention is given in the following. As shown in FIG. 6, the electric control system according to the present invention basically includes a power supply device 61 (which is battery 61 in the embodiment) and controllers 66 electrically connected with the power supply device, wherein the controllers 66 includes left and right controllers 661 and 662 which are electrically connected with the left and right motors 671 and 672 through the reversing switch 65, and the left controller 661 controls the rotating speed of the left motor 671 and the right controller 662 controls the rotating speed of the right motor 672. The reversing switch operates to change the polarity of the motor electrode. It should be understood that the reversing switch is operated causing that the polarity of the motor electrode is changed and then the motor runs forward or backward. As the result, with the vehicle, the function of advancing and backing is achieved. In the present embodiment, the reversing switch has a handle 64 with first, second and middle positions. With the reversing switch at the first position, the left and right motors run forward. With the reversing switch at the second position, the left and right motors run backward. With the same at the middle position, the reversing switch electrically disconnects the battery from the controllers, and then the left and right motors stop.

Hereinbefore, the reversing switch is provided such that the function of backing is achieved in vehicles. Hereinafter, it will be given that, in vehicles, a Hall accelerator 62 is provided so as to obtain the function of adjusting speed, steering sensors 68 are provided so as to obtain the function of electronic differential speed, and a brake powerdown switch is provided as so to obtain the function of brake powerdown momentum.

As shown in FIG. 6, the left and right controllers 661 and 662 are also electrically connected with a control loop controlling the actions of the controllers. The control loop includes the Hall accelerator 62 connected in series, an electronic door lock 63, the brake powerdown switch 691, and the steering sensors 68 having two Hall sensors, i.e. a left Hall sensor 681 electrically connected to the left controller 661 and a right Hall sensor 682 electrically connected to the right controller 662. The operating voltage Vc of the Hall accelerator, which is generally +5V, is supplied by the left and right controllers. The Hall accelerator 62 is operated to generally output a signal voltage of 1-4.2V which is fed back to the left controller 661 through the electronic door lock 63, the brake powerdown switch 691, and the left Hall sensor 681. At the same time, the signal voltage is fed back to the right controller 662 through the electronic door lock 63, the brake powerdown switch 691, and the right Hall sensor 682. Thereby, the control loop is disconnected if only one of the electronic door lock 63 and the brake powerdown switch 691 is turned off.

It is apparent to those skilled in the art that if the left and right sensors can change the signal voltage controlling the controllers, the left and right controllers can output different control voltages depending on the signal voltages of the control loop and control the motors to run at different speeds. In this way, during steering, as long as the left and right Hall sensors sense the steering of the front wheels and output the corresponding voltages, the value of the signal voltage is changed. For example, during steering, the Hall sensor sensing the inner side of the steering outputs a reduction signal voltage causing the signal voltage output from the Hall accelerator is decreased while the Hall sensor sensing the outer side of the steering does not output the reduction signal voltage, thereby the motor connected to the rear wheel on the inner side of steering is reduced on the speed and the motor connected to the rear wheel on the outer side of steering is not changed on the speed. As the result, the function of the electric differential is fulfilled.

Figure 8:
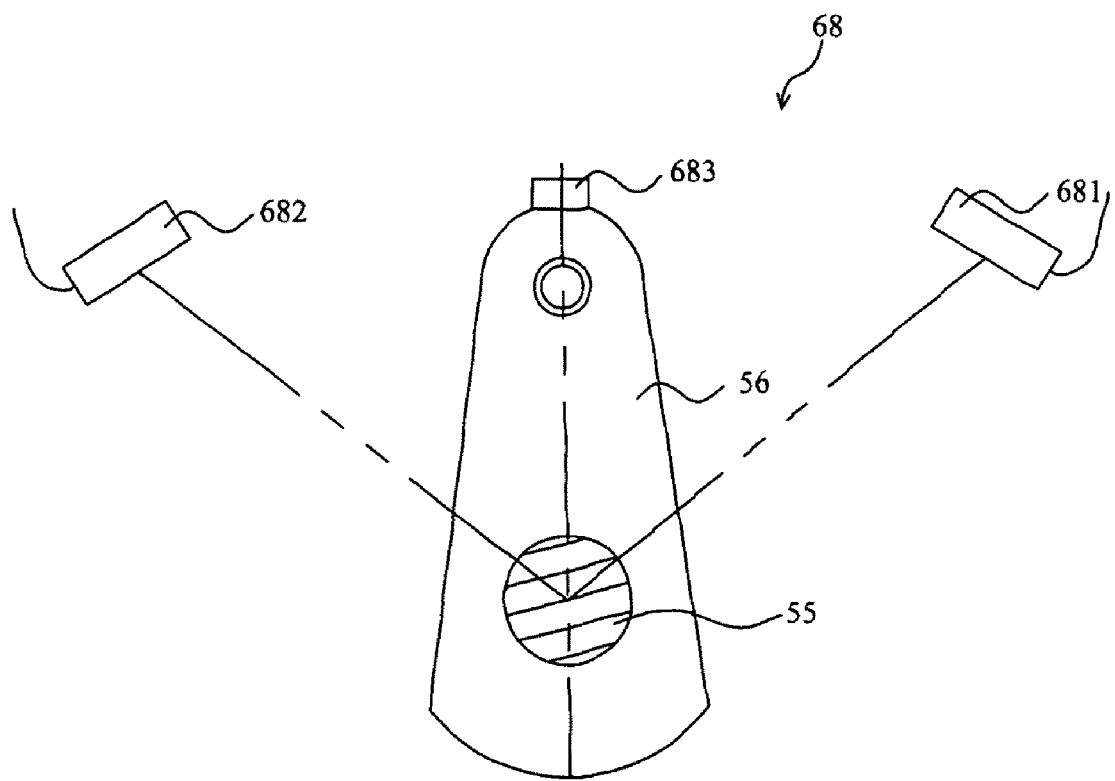
FIG. 8 is a schematic diagram of a steering sensor.

Meanwhile, as shown in FIG. 8, the steering sensor 68 comprises a magnet 683 provided on the one side of the steering swinging arm far away from the post and the Hall sensors 681 and 682 provided on both sides of the steering swinging arm. During the direct movement of the vehicle, the steering swinging arm is located at the middle position between the two Hall sensors. Because of the weak magnetic flux received by the two Hall sensors, as connected with the control loop in series, the two Hall sensors do not impact on the signal voltage controlling the left and right controllers, and operate the Hall accelerator, thus the vehicle obtains different driving speeds. As the steering swinging arm is offset from the middle position due to the steering of the steering handlebar, the two sensors sensing different flux are connected in series in the control loop, causing the signal voltages of the left and right controllers are different, e.g., the motor driving the rear wheel on the inner side of steering is made to be reduced on the speed and the motor driving the rear wheel on the outer side of steering is made to be unchanged on the speed. Accordingly, the effect of differential speed that is equivalent to the conventional differential half-axle is obtained.

Meanwhile, the brake powerdown switch 691 is provided below the brake pedal. During the braking, the brake powerdown switch 691 is actuated to disconnect the return path of signal voltages. An accelerating pedal 621 controls the above Hall accelerator 62 through a steel wire. It is obvious to those skilled in the art that the Hall accelerator can also be controlled by a handle and the left and right controllers may be a chopping speed regulator (PWM). The associated operating principle and configuration are known for those skilled in the art, so not described again herein.

While the present invention has been described and illustrated herein with reference to the preferred embodiments thereof, it will be apparent to those skilled in the art that various changes and modifications may be made therein without departing from the spirit and scope of the invention. Thus, it is intended that the present invention cover the modifications and variations of this invention that come within the scope of the appended claims and their equivalents.

| 1 | frame | 11 | beam |
| 111 | pendulum shaft | 121/122 | left/right angle iron |
| 13 | rectangle structure | 15 | square tube |
| 2 | front axle | 21 | lateral front axle |
| 211/212 | left/right supporting base | 22 | bumper |
| 231/232 | square tube | 261/262 | left/right front wheel |
| 3 | rear axle | 31 | connecting bracket |
| 311 | opening | 312 | nut |

-continued

| 351/352 | left/right support part/s | 361 | movable pressing plate |
| 362 | resistant member | 363 | guide post |
| 671/672 | left/right full gear reduction motor | 331/332 | left and right rear wheel |
| 371/372 | limiting block | 5 | steering control device |
| 51 | steering handlebar | 52 | steering handlebar post |
| 53 | speedy chuck | 54 | slipknot |
| 55 | steering post | 56 | steering swinging arm |
| 57 | lateral draw rod | 571/572/573 | draw rod ball bearing |
| 56 | long draw rod | 581/582 | left/right steering knuckle |
| 6 | electric control system | 61 | battery |
| 62 | Hall accelerator | 63 | electronic door lock |
| 64 | handle | 65 | reversing switch |
| 66 | controller | 661/662 | left/right controller |
| 671/672 | left/right rear wheel | 691 | brake pedal |
| 68 | steering sensors | 681/682 | left/right Hall sensor |

The invention claimed is:

1. An electric vehicle chassis comprising:
a rigid frame;
a rear axle; and
an electric control system that in turn includes a power supply device, left and right controllers electrically connected to the power supply device, and a control loop controlling the actions of the left and right controllers,
wherein left and right rear wheels on both sides of the rear axle are separately driven by left and right motors, respectively, and the rear axle is connected with the frame through a pendulum shaft which is provided for the swinging of the rear axle relative to the frame,
wherein the left controller is electrically connected to the left motor, the right controller is electrically connected to the right motor, a Hall accelerator is provided in the control loop to operate and output signal voltages, and the left and right controllers receive the signal voltages and output the corresponding driving voltages, respectively, to control the rotating speeds of the left and right motors,
wherein the frame is provided with a contact surface thereon, corresponding to which the rear axle is also provided with a contact surface, and the pendulum shaft engage in an opening of the rear axle,
wherein the contact surface on the frame is a slant surface to which the pendulum shaft is perpendicular,
wherein the rear axle has a recess region in which the left and right motors are located and a reduction device is provided respectively between the left motor and the left rear wheel and between the right motor and the right rear wheel,
wherein the rear axle includes left and right support parts supporting the left and right rear wheels and a connecting bracket connecting the left and right support parts,
wherein the connecting bracket presents a recess shape and is provided slantly downward,
wherein a limiting device is provided between the rear axle and the frame to define the swinging region of the rear axle relative to the frame,
wherein the limiting device includes a movable pressing plate, a resistant member biasing against the pressing plate, and a guide post for the movable pressing plate, wherein the guide post is mounted on the frame,
wherein the control loop also includes steering sensors connected in series therein, the steering sensor senses and measures the steering of the front wheels and then outputs the corresponding reduction signal voltage to reduce the speed of the motor connected to the rear wheel on the inner side of the steering, and wherein the steering sensor basically comprises a magnet fastened on a steering swinging arm and left and right Hall sensors symmetrically provided on both sides of the steering swinging arm, wherein the left and right Hall sensors sense and measure the steering of the steering swinging arm and then output the corresponding reduction signal voltage.

2. The electric vehicle chassis as recited in claim 1, wherein the limiting device comprises left and right stop blocks which are provided symmetrically on the connecting bracket and on both sides of the longitudinal central plane of the frame.

3. The electric vehicle chassis as recited in claim 1, wherein an electronic door lock is connected in series in the control loop, a reversing switch is electrically connected between the left and right controllers and the left and right motors, the reversing switch has the first and the second position, wherein with the reversing switch in the first position the left and right motors are running forward, while with the reversing switch in the second position the left and right motors are running backward.

4. The electric vehicle chassis as recited in claim 1, further comprising a steering control device for the front axle and front wheels that are connected together with the rigid frame, wherein the steering control device includes a steering handlebar, a post transferring the torque of the steering handlebar, a steering swinging arm, a lateral draw rod, left and right steering knuckles connected to the left and right front wheels and a long draw rod connecting the left and right steering knuckles, wherein the post is connected with the steering swinging arm to drive the steering swinging arm to rotate, the lateral draw rod is connected at one end with the end of the steering swinging arm far away from the post and at the other end with one of the left and right steering knuckles, the left and right steering knuckles are pivotally connected to both ends of the front axle, the left and right front wheels are mounted on the left and right steering knuckles, respectively, and the left and right front wheels are steered through the turning of the steering handlebar, 5. The electric vehicle chassis as recited in claim 1, wherein the frame has only one front wheel which is a steering wheel.

6. The electric vehicle chassis as recited in claim 3, wherein a brake powerdown switch is connected in series in the control loop and when a brake pedal is at the braking position, the brake powerdown switch disconnects the control loop of the controllers.

7. The electric vehicle chassis as recited in claim 4, wherein the front axle is fastened at both ends with a steering knuckle bearing housing with which the left and right steering knuckles are pivotally connected together through a king bolt and the steering knuckles slant backward while the king bolt slant inward.

8. An electric vehicle chassis comprising:
a driven front axle;
a rigid frame fixedly connected to the driven front axle;
a rear axle connected to the frame; and
a steering control device which in turn includes a handlebar, a post transferring the torque of the steering handlebar, a steering swinging arm, a lateral draw rod, left and right steering knuckles connected to left and right front wheels, and a long draw rod connecting the left and right steering knuckles,
wherein left and right rear wheels supported on both sides of the rear axle are directly driven by left and right full gear reduction motors, respectively, wherein the full gear reduction motor includes a motor and a gear reduction device forming a one-piece structure, and the rear axle also has a limiting swinging device of the rear axle relative to the frame thereon,
wherein the post is fixedly connected to one end of the steering swinging arm to drive the steering swinging arm to rotate, the lateral draw rod is pivotally connected at one end to the end of the steering swinging arm far away from the post and at the other end with one of the left and right steering knuckles, the left and right steering knuckles are pivotally connected to both ends of the front axle, the left and right front wheels are mounted on the left and right steering knuckles, respectively, and the left and right front wheels are driven to steer through the turning of the steering handlebar, and
wherein the rear axle includes left and right support parts supporting the left and right rear wheels and a connecting bracket fixedly connecting the left and right support parts, the left and riht full gear reduction motors are located in the recess region defined by the connecting bracket, the limiting swinging device includes a pendulum shaft and stop blocks, wherein the pendulum shaft is provided slantly on the frame and in the longitudinal central plane of the frame, the stop blocks are symmetrically provided on the connecting bracket with the pendulum shaft as the center, and the rigid frame is connected with the connecting bracket of the rear axle through the pendulum shaft.

9. The electric vehicle chassis as recited in claim 8, wherein a steering handlebar post is also provided between the steering handlebar and the post, wherein the steering handlebar is mounted on the steering handlebar post with its position being adjustable, the steering handlebar post is inserted into the steering post including an upper post and a lower post pivotally connected together.

10. An electric vehicle chassis comprising:
a rigid frame;
a rear axle; and
an electric control system that in turn includes a power supply device, left and right controllers electrically connected to the power supply device, and a control loop controlling the actions of the left and right controllers,
wherein left and right rear wheels on both sides of the rear axle are separately driven by left and right motors, respectively, and the rear axle is connected with the frame through a pendulum shaft which is provided for the swinging of the rear axle relative to the frame,
wherein the left controller is electrically connected to the left motor, the right controller is electrically connected to the right motor, a Hall accelerator is provided in the control loop to operate and output signal voltages, and the left and right controllers receive the signal voltages and output the corresponding driving voltages, respectively, to control the rotating speeds of the left and right motors,
wherein the frame is provided with a contact surface thereon, corresponding to which the rear axle is also provided with a contact surface, and the pendulum shaft engage in an opening of the rear axle,
wherein the contact surface on the frame is a slant surface to which the pendulum shaft is perpendicular,
wherein the rear axle has a recess region in which the left and right motors are located and a reduction device is provided respectively between the left motor and the left rear wheel and between the right motor and the right rear wheel,
wherein the rear axle includes left and right support parts supporting the left and right rear wheels and a connecting bracket connecting the left and right support parts, wherein the connecting bracket presents a recess shape and is provided slantly downward, wherein a limiting device is provided between the rear axle and the frame to define the swinging region of the rear axle relative to the frame, wherein the limiting device includes a movable pressing plate, a resistant member biasing against the pressing plate, and a guide post for the movable pressing plate, wherein the guide post is mounted on the frame, wherein the control loop also includes steering sensors connected in series therein, the steering sensor senses and measures the steering of the front wheels and then outputs the corresponding reduction signal voltage to reduce the speed of the motor connected to the rear wheel on the inner side of the steering, and wherein an electronic door lock is connected in series in the control loop, a reversing switch is electrically connected between the left and right controllers and the left and right motors, the reversing switch has the first and second positions, wherein with the reversing switch in the first position the left and right motors are running forward, while with the reversing switch in the second position the left and right motors are running backward.

11. The electric vehicle chassis as recited in claim 10, wherein a brake powerdown switch is connected in series in the control loop and when a brake pedal is at the braking position, the brake powerdown switch disconnects the control loop of the controllers.

\* \* \* \* \*